United States Patent
Hofmann et al.

(10) Patent No.: US 9,238,711 B2
(45) Date of Patent: Jan. 19, 2016

(54) HYDROXYLAMINO POLYMER AND METHOD FOR THE PRODUCTION THEREOF

(71) Applicant: Bayer Intellectual Property GmbH, Monheim (DE)

(72) Inventors: Jorg Hofmann, Krefeld (DE); Klaus Lorenz, Dormagen (DE); Hartmut Nefzger, Pulheim (DE)

(73) Assignee: Bayer Intellectual Property GmbH, Alfred-Nobel Strasse, Monheim (DE)

( * ) Notice: Subject to any disclaimer, the term of this patent is extended or adjusted under 35 U.S.C. 154(b) by 0 days.

(21) Appl. No.: 14/366,336

(22) PCT Filed: Dec. 17, 2012

(86) PCT No.: PCT/EP2012/075830
§ 371 (c)(1),
(2) Date: Jun. 18, 2014

(87) PCT Pub. No.: WO2013/092508
PCT Pub. Date: Jun. 27, 2013

(65) Prior Publication Data
US 2015/0080535 A1 Mar. 19, 2015

(30) Foreign Application Priority Data
Dec. 20, 2011 (EP) .................................. 11194418

(51) Int. Cl.
| | | |
|---|---|---|
| C08G 63/676 | (2006.01) | |
| C08G 18/48 | (2006.01) | |
| C08G 18/38 | (2006.01) | |
| C08G 18/42 | (2006.01) | |
| C08G 18/46 | (2006.01) | |
| C08G 63/685 | (2006.01) | |
| C08G 73/02 | (2006.01) | |

(52) U.S. Cl.
CPC .......... *C08G 63/676* (2013.01); *C08G 18/3821* (2013.01); *C08G 18/4252* (2013.01); *C08G 18/4615* (2013.01); *C08G 18/4887* (2013.01); *C08G 63/6854* (2013.01); *C08G 73/02* (2013.01)

(58) Field of Classification Search
CPC .... C08G 18/10; C08G 18/42; C08G 18/4244; C08G 18/4247; C08G 18/4252; C08G 18/4261; C08G 63/66; C08G 63/668; C08G 63/672; C08G 63/676; C08G 63/6854; C08G 18/3821; C08G 18/4615; C08G 18/4887; C08G 73/02
USPC ........................ 525/440.01, 440.07, 447, 449
See application file for complete search history.

(56) References Cited

U.S. PATENT DOCUMENTS

| | | | |
|---|---|---|---|
| 4,874,837 A | 10/1989 | Bershas et al. | |
| 5,597,390 A | 1/1997 | Loper | |
| 5,734,002 A | 3/1998 | Reich et al. | |
| 5,739,192 A | 4/1998 | Blizzard et al. | |
| 5,977,284 A | 11/1999 | Reich et al. | |
| 6,177,144 B1 | 1/2001 | Kranig et al. | |
| 6,361,843 B1 | 3/2002 | Smith | |
| 2005/0171002 A1 | 8/2005 | Mohanty et al. | |
| 2010/0099788 A1 * | 4/2010 | Lorenz et al. ................. | 521/172 |

FOREIGN PATENT DOCUMENTS

| | | |
|---|---|---|
| JP | 2004-89860 | 3/2005 |
| WO | 2010090345 A1 | 8/2010 |
| WO | 2013092501 A1 | 6/2013 |

* cited by examiner

*Primary Examiner* — Robert Jones, Jr.
(74) *Attorney, Agent, or Firm* — N. Denise Brown

(57) ABSTRACT

The present invention relates to a process for the preparation of a hydroxy-amino polymer, comprising the steps: a) reacting an H-functional starter compound carrying at least one Zerewitinoff-active H atom with an unsaturated cyclic carboxylic acid anhydride to give a carboxyl-group-carrying prepolymer, b) reacting the carboxyl-group-carrying prepolymer with at least one epoxide compound to give a hydroxyl-group-carrying prepolymer, c) adding a primary amine and/or ammonia to the double bond of the hydroxyl-group-carrying prepolymer obtained according to step b) to give the hydroxy-amino polymer, wherein the ratio of the amount of carboxylic acid anhydride to the number of Zerewitinoff-active H atoms of the H-functional starter compound is so chosen that almost all the Zerewitinoff-active H atoms of the H-functional starter compound are reacted. The invention relates additionally to a hydroxy-amino polymer obtainable by the above-mentioned process, wherein the ratio of the amount of unsaturated cyclic carboxylic acid anhydride to the number of Zerewitinoff-active H atoms of the H-functional starter compound is at least approximately 0.9:1, and further to the use of this hydroxy-amino polymer in the preparation of a polyurethane urea polymer.

13 Claims, No Drawings

HYDROXYLAMINO POLYMER AND METHOD FOR THE PRODUCTION THEREOF

FIELD OF THE INVENTION

The present invention relates to a hydroxy-amino polymer, to a process for its preparation, and to the use of such hydroxy-amino polymers in the preparation of polyurethane ureas.

BACKGROUND

Polymers which are both amine-functional and carry hydroxyl groups (so-called hydroxy-amino polymers) are increasingly of interest in some fields of application, especially in the field of the polyurethane industry. The reason for this is that the presence of two different types of functional groups, namely the amine functionalities and the hydroxyl groups, enables novel property and processing profiles to be achieved. For example, combining the amino groups, which are significantly more reactive towards isocyanate groups, with the less reactive hydroxyl groups gives rise to the possibility of influencing the progress of curing processes over time in a desirable manner, which has hitherto not been possible or has been possible to only a limited extent in the presence of only one type of the above-mentioned isocyanate-reactive functional groups.

In general, the amino functionality of hydroxy-amino polymers can be introduced into macromolecules by the addition of primary amines or ammonia to low-electron double bonds, for example of the (meth)acrylate type. The addition of amines to (meth)acrylate-group-containing polymers, inter alia to (meth)acrylate-group-containing polyethers, is known per se; for example, such processes are mentioned in U.S. Pat. No. 5,739,192 A1, U.S. Pat. No. 5,597,390 A1, US 2005/0171002 A1, DE 196 16 984 A1, DE 195 08 308 A1, WO 2010/090345 A1, JP 2009/22753 A1 and JP 04089860 A1.

By contrast, the obtainment of the precursor compounds comprising the low-electron double bonds in the prior art is either not described or takes place via condensation reactions that proceed according to the laws of statistics, for example by the esterification of acrylic acid with difunctional polyethers or the reaction of acryloyl chloride with dysfunctional polyethers.

A common feature of all the described processes is that the introduction of double bonds into the precursor compounds of the hydroxy-amino polymers takes place at the expense of the number of hydroxy functions. Accordingly, these processes do not allow the original hydroxy functionality, which in the case of polyether molecules is generally given by the functionality of the starter molecules used to prepare the polyethers, to be retained during the introduction of the amino fractions.

U.S. Pat. No. 4,874,837 A1 discloses a process in which first diethylene glycol or a mixture of diethylene glycol and a low molecular weight polyether polyol having a molecular weight of from 100 to 600 g/mol is reacted with maleic anhydride or a mixture of maleic anhydride and a further anhydride, maleic anhydride and diethylene glycol being used approximately in a stoichiometric molar ratio. The resulting acid group of the semiester is then converted back into a hydroxy group by reaction with an epoxide, before the amino group is finally introduced by Michael addition of diethanolamine, or a mixture of diethanolamine and further amino alcohols containing primary or secondary amino groups, or diamines containing primary or secondary amino groups to the reactive double bond of the hydroxy maleate.

In the case of the process described in U.S. Pat. No. 4,874,837 A1 it is in some cases perceived to be a disadvantage that the process is limited structurally to the use of diethylene glycol or a mixture of diethylene glycol and a low molecular weight polyether polyol as precursor. A possible reason for this is possibly the falling reactivity of the OH groups of the polyether polyol, in relation to the reaction carried out here, as the chain length increases. Moreover, in each case only approximately one hydroxy group of this precursor is reacted with the anhydride. Furthermore, the Michael addition to the reactive double bond is limited to diethanolamine or a mixture of diethanolamine and further amines reactive with isocyanates.

Accordingly, the object of the present invention was to provide a process for the preparation of hydroxy-amino polymers which is more universally usable, it being possible in particular also to produce hydroxy-amino polymers from polyether polyols with a greater chain length. At the same time, the process is to be simple to carry out and is to suppress the formation of secondary products, such, as, for example, transesterification products, as far as possible, so that working up of the process products is generally not necessary.

SUMMARY

The object is achieved by a process for the preparation of a hydroxy-amino polymer comprising the steps:
a) reacting an H-functional starter compound carrying at least one Zerewitinoff-active H atom with an unsaturated cyclic carboxylic acid anhydride to give a carboxyl-group-carrying prepolymer,
b) reacting the carboxyl-group-carrying prepolymer with at least one epoxide compound to give a hydroxyl-group-carrying prepolymer,
c) adding a primary amine and/or ammonia to the double bond of the hydroxyl-group-carrying prepolymer obtained according to step b) to give the hydroxy-amino polymer,
wherein the ratio of the amount of carboxylic acid anhydride to the number of Zerewitinoff-active H atoms of the H-functional starter compound is so chosen that almost all the Zerewitinoff-active H atoms of the H-functional starter compound are reacted.

DETAILED DESCRIPTION

Surprisingly, it has been found that it is possible by means of the process according to the invention to prepare hydroxy-amino polymers that have a ratio of amine functionality to hydroxy functionality of approximately 1:1. Moreover, the immediate process product does not necessarily have to be purified prior to further use, for example in the preparation of polyurethane urea polymers. The process products have high purity, in particular as regards the content of undesirable transesterification products, and a comparatively high amine and hydroxy group number.

The process can further also be so configured that, after the epoxide compound present has reacted completely in step b), unsaturated cyclic carboxylic acid anhydride is again metered in, for example approximately 1 mol of carboxylic acid anhydride per mol of OH groups formed by the addition of the epoxide compound. In other words, process step a) is repeated, the H-functional starter compound carrying a Zerewitinoff-active H atom then being the addition product of the original starter compound, cyclic unsaturated carboxylic acid anhydride and epoxide compound. A desired amount of epoxide compounds is then again added, that is to say step b) is repeated, in order to obtain the hydroxyl-group-carrying prepolymer. This then has approximately 2 double bonds per hydroxyl group, so that two amine functionalities can later be introduced by a Michael addition. The above-mentioned reaction can also be repeated two or more times, so that a desired number of amine functionalities per original Zerewitinoff-active H atom can be incorporated into the hydroxy-amino polymer. This can be, for example, 2 or more, in particular 3 or more, amine functionalities per original Zerewitinoff-active H atom.

Within the context of the present invention it is provided that the H-functional starter compound carries at least one Zerewitinoff-active H atom. A Zerewitinoff-active H atom is understood within the context of the present invention as being an acidic H atom or "active" H atom. Such an atom can be identified in a manner known per se by reactivity with a corresponding Grignard reagent. The amount of Zerewitinoff-active H atoms is typically measured by the amount of methane liberated when the substance to be tested is reacted with methylmagnesium bromide ($CH_3$—MgBr) according to the following reaction equation (formula 1):

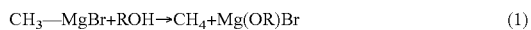

$$CH_3\text{—}MgBr + ROH \rightarrow CH_4 + Mg(OR)Br \quad (1)$$

Zerewitinoff-active H atoms typically originate from C—H acidic organic groups, —OH, —SH, —$NH_2$ or —NHR where R is an organic radical, and —COOH.

Particularly suitable H-functional starter compounds possess an H functionality of from 1 to 35, in particular from 1 to 16, preferably from 1 to 8, the H functionality being based on the above-mentioned Zerewitinoff-active H atoms.

There are suitable as the H-functional starter compound in particular polyhydroxy-functional polymers which are selected in particular from straight-chained and/or branched polyethers, polyesters, polyether polyesters, polycarbonates, polyether polycarbonates, as well as combinations thereof.

If the H-functional starter compound comprises polyethers or polyether groups, these more preferably comprise ethylene oxide units, the amount by weight of ethylene oxide units in the polyether in particular being at least 50 wt. %, preferably at least 60 wt. %. The remainder of the polyether structure, or of the polyether structural units, can be composed of other alkylene oxide units such as in particular (poly)propylene oxide, (poly)butylene oxide or other (poly)alkylene oxide groups and mixtures thereof.

The molecular weights of the H-functional starter compound can vary over wide ranges, preference being given to a mean molar weight of from 200 to 10,000 g/mol, in particular from more than 600 to 9000 g/mol, preferably from 800 to 8000 g/mol. In the case of polymeric compounds, the mean molar weight denotes the number average thereof, which can be determined by methods known per se, for example by gel permeation chromatography or by calculating the OH number. Of the above-mentioned mean molar weights of the H-functional starter compound, those of more than 600 g/mol or 800 g/mol or more are of particular interest because it has hitherto not been possible readily to prepare them by processes known from the prior art. A possible reason for this can be seen in the fall in the reactivity of the hydroxyl group in the reaction with the carboxylic acid anhydride as the chain length of the H-functional starter compound, or of the polyether polyol used in the prior art, increases. With the process according to the invention, on the other hand, it is possible to react even higher molecular weight starter compounds which are slower to react, in particular by the use of specific catalysts, which are described in greater detail below.

In addition to the hydroxy-functional starters that are preferably to be used, amino-functional starters can also be employed. Examples of hydroxy-functional starter compounds are methanol, ethanol, 1-propanol, 2-propanol and higher aliphatic monols, in particular fatty alcohols, phenol, alkyl-substituted phenols, propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol, sorbitol, sucrose, hydroquinone, pyrocatechol, resorcinol, bisphenol F, bisphenol A, 1,3,5-trihydroxybenzene, as well as methylol-group-containing condensation products of formaldehyde and phenol or urea. It is also possible to use highly functional starter compounds based on hydrogenated starch hydrolysis products. Such compounds are described, for example, in EP 1525244 A1.

Examples of suitable amino-group-containing H-functional starter compounds are ammonia, ethanolamine, diethanolamine, triethanolamine, isopropanolamine, diisopropanolamine, ethylenediamine, hexamethylenediamine, aniline, the isomers of toluidine, the isomers of diaminotoluene, the isomers of diaminodiphenylmethane and higher nuclear products formed in the condensation of aniline with formaldehyde to give diaminodiphenylmethane, also methylol-group-containing condensation products of formaldehyde and melamine as well as Mannich bases. Moreover, ring-opening products of cyclic carboxylic acid anhydrides and polyols can also be used as starter compounds. Examples are ring-opening products of phthalic anhydride or succinic anhydride on the one hand and ethylene glycol, diethylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol or sorbitol on the other hand. In addition, it is also possible to use mono- or poly-functional carboxylic acids directly as starter compounds.

Furthermore, pre-produced alkylene oxide addition products of the mentioned starter compounds, that is to say polyether polyols preferably having OH numbers of from 5 to 1000 mg KOH/g, more preferably from 10 to 1000 KOH/g, can also be used in the process as starter compounds or added to the reaction mixture. It is also possible to use polyester polyols preferably having OH numbers in the range of from 6 to 800 mg KOH/g as starters or co-starters in the process according to the invention. Polyester polyols suitable therefor can be prepared, for example, by known processes from organic dicarboxylic acids having from 2 to 12 carbon atoms and polyhydric alcohols, preferably diols, having from 2 to 12 carbon atoms, preferably from 2 to 6 carbon atoms.

There can further be used as H-functional starter substances polycarbonate polyols, polyester carbonate polyols or polyether carbonate polyols, preferably polycarbonate diols, polyester carbonate diols or polyether carbonate diols, preferably in each case having OH numbers in the range of from 6 to 800 mg KOH/g, as starters or co-starters. These are prepared, for example, by reaction of phosgene, dimethyl carbonate, diethyl carbonate or diphenyl carbonate with di- or higher-functional alcohols or polyester polyols or polyether polyols.

It is also possible to use polyether carbonate polyols, as are obtainable, for example, by catalytic reaction of alkylene oxides (epoxides) and carbon dioxide in the presence of H-functional starter substances (see e.g. EP-A 2046861). These polyether carbonate polyols have an OH number of preferably from ≥5 mg KOH/g to ≤140 mg KOH/g, particularly preferably from ≥9 to ≤112 mg KOH/g.

In step a) of the process according to the invention there are preferably used amino-group-free H-functional starter compounds with hydroxy groups as carriers of the active hydrogens, such as, for example, methanol, ethanol, 1-propanol, 2-propanol and higher aliphatic monols, in particular fatty alcohols, phenol, alkyl-substituted phenols, propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, pentaerythritol, sorbitol, sucrose, hydroquinone, pyrocatechol, resorcinol, bisphenol F, bisphenol A, 1,3,5-trihydroxybenzene, methylol-group-containing condensation products of formaldehyde and phenol and hydrogenated starch hydrolysis products. Mixtures of different H-functional starter compounds can also be used.

For the unsaturated cyclic carboxylic acid anhydride used within the context of the process according to the invention there are suitable all compounds known as such to the person skilled in the art. These are, for example, unsaturated cyclic dicarboxylic acid anhydrides, such as maleic anhydride, tetrahydrophthalic anhydride, in particular 3,4,5,6-tetrahydrophthalic anhydride, and combinations thereof.

As the epoxide compound which can be used according to the invention there can be chosen those representatives which contain from 2 to 24 carbon atoms, in particular from 2 to 12 carbon atoms, more preferably from 2 to 6 carbon atoms, as well as combinations of different epoxide compounds of the above-mentioned type. Epoxides having from 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidised fats as mono-, di- and tri-glycerides, epoxidised fatty acids, $C_1$-$C_{24}$-esters of epoxidised fatty acids, epichlorohydrin, glycidol and derivatives of glycidol such as, for example, methyl glycidyl ether, ethyl glycidyl ether, 2-ethylhexyl glycidyl ether, allyl glycidyl ether, glycidyl methacrylate, as well as epoxide-functional alkyloxysilanes such as, for example, 3-glycidyloxypropyltrimethoxysilane, 3-glycidyloxypropyltriethoxysilane, 3-glycidyloxypropyltripropoxysilane, 3-glycidyloxypropyl-methyl-dimethoxysilane, 3-glycidyloxypropyl-ethyldiethoxysilane and 3-glycidyloxypropyltriisopropoxysilane. Ethylene oxide and/or propylene oxide are preferably used.

In the process according to the invention it is provided that the ratio of the amount of carboxylic acid anhydride to the number of Zerewitinoff-active H atoms of the starter compound is so chosen that almost all the Zerewitinoff-active H atoms are reacted. For this stoichiometric reaction, the ratio of the amount of carboxylic acid anhydride to the number of Zerewitinoff-active H atoms of the H-functional starter compound can be approximately from 0.9:1 to 1.5:1, in particular from 0.98:1 to 1.2:1.

In a further development of the process according to the invention, the ratio of the amount of epoxide compound to the amount of carboxylic acid anhydride is adjusted to at least 1:1, preferably at least 1.2:1. In this manner it can be ensured that all the acid groups of the carboxyl-group-carrying prepolymer that are produced by the addition in step a) are reacted, yielding a terminal hydroxyl group.

Within the context of the process according to the invention it is provided inter alia that a primary amine or ammonia is added to the double bond of the hydroxyl-group-carrying prepolymer. Suitable amines are, for example, ammonia, aliphatic, cycloaliphatic and/or araliphatic monoamines having a primary amino group such as, for example, methylamine, ethylamine, 1-aminopropane, 2-aminopropane, 1-aminobutane, 2-aminobutane, isobutylamine, 1-aminopentane, 1-aminohexane, dodecylamine, octadecyl-amine, cyclohexylamine and benzylamine; aliphatic, cycloaliphatic and/or araliphatic monoamines having a primary amino group and a secondary amino group, wherein the secondary amino group may also be part of a ring system, such as, for example, N-methylethylenediamine, N-methylpropylenediamine, N-(2-aminoethyl)-piperazine and 3-amino-1,2,4-triazole; aliphatic, cycloaliphatic and/or heterocyclic diamines having a primary and a tertiary amino group and optionally a secondary amino group such as, for example, N,N-dimethylethylenediamine, N,N-dimethyl-1,3-diaminopropane, N,N-dimethyl-1,8-diaminooctane, N,N-dimethyl-1,4-diaminocyclohexane; and aliphatic diamines having two primary and at least one secondary amino group, such as, for example, diethylenetriamine, triethylenetetramine, tetraethylenepentamine and bis-(3-aminopropyl)-amine. Furthermore, amines that also comprise hydroxy groups in addition to the primary amino group, such as, for example, ethanolamine or isopropanolamine, are suitable for the process according to the invention.

Also suitable are (cyclo)aliphatic diamines. These are compounds having two primary amino groups with the general formula $NH_2$—R—$NH_2$, in which R represents an aliphatic or cycloaliphatic radical having from 2 to 21, preferably from 2 to 15 and particularly preferably from 2 to 10 carbon atoms. Examples which may be mentioned are ethylenediamine, 1,2- and 1,3-propylenediamine, 1,4-diaminobutane, 1,6-diaminohexane, 2,2,4- and 2,4,4-trimethyl-1,6-diaminohexane, 1,4-diaminocyclohexane, 1,5-diamino-2-methylpentane, 5-amino-1-aminomethyl-1,3,3-trimethylcyclohexane (isophoronediamine), bis-(4-aminocyclohexyl)-methane, bis-(4-amino-3-methylcyclohexyl)-methane, 1-amino-1-methyl-3(4)-aminomethylcyclohexane, bis-(4-amino-3,5-diethylcyclohexyl)-methane, bis-aminomethyl-hexahydro-4,7-methano-indane, 2,3-, 2,4- and 2,6-diamino-1-methylcyclohexane or mixtures of these diamines. The mentioned mono- and oligo-amines can of course also be used in the form of a mixture.

The molar ratio of primary amino groups to double bonds capable of addition is preferably from 0.01:1 to 1.1:1, more preferably from 0.1:1 to 1.1:1, particularly preferably from 0.5:1 to 1.1:1 and most particularly preferably from 1:1 to 1.1:1.

According to a particularly preferred embodiment of the process according to the invention, a catalyst is added to the reaction mixture at the same time as or prior to the reaction of the carboxyl-group-carrying prepolymer with the epoxide compound. Tertiary amines are preferably used for that purpose. The amount of catalyst, based on the total mass of the reaction mixture, can be, for example, from ≥10 ppm to ≤10,000 ppm, preferably from ≥50 ppm to ≤5000 ppm and more preferably from ≥100 ppm to ≤2000 ppm.

In a further embodiment of the process according to the invention, the catalyst is selected from the group comprising:
(A1) amines of the general formula (2):

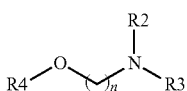 (2)

wherein:
R2 and R3 independently of one another are hydrogen, alkyl or aryl; or
R2 and R3, together with the N atom carrying them, form an aliphatic, unsaturated aromatic heterocyclic ring;
n is an integer from 1 to 10;
R4 is hydrogen, alkyl or aryl; or
R4 represents —$(CH_2)_x$—$N(R41)(R42)$, wherein:
R41 and R42 independently of one another are hydrogen, alkyl or aryl; or
R41 and R42, together with the N atom carrying them, form an aliphatic, unsaturated or aromatic heterocyclic ring;
x is an integer from to 1 to 10;
(B1) amines of the general formula (3):

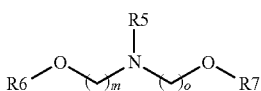 (3)

wherein:
R5 is hydrogen, alkyl or aryl;
R6 and R7 independently of one another are hydrogen, alkyl or aryl;
m and o independently of one another are an integer from 1 to 10;
and/or
(C1) diazabicyclo[2.2.2]octane, diazabicyclo[5.4.0]undec-7-ene, dialkylbenzylamine, dimethylpiperazine, 2,2'-dimorpholinyl diethyl ether and/or pyridine.

Amines of the general formula (2) can be described in the broadest sense as amino alcohols or their ethers. If R4 is hydrogen, then the catalysts can be incorporated into a polyurethane matrix when the hydroxy-amino polymer according to the invention is reacted with a polyisocyanate. This is advantageous to prevent escape of the catalyst, which in the case of amines can be accompanied by disadvantageous odour problems, at the polyurethane surface, so-called "fogging" or VOC (volatile organic compounds) problems.

Amines of the general formula (3) can be described in the broadest sense as amino (bis)alcohols or their ethers. If R6 or R7 is hydrogen, then these catalysts can likewise be incorporated into a polyurethane matrix.

Preferably, in the amine of the general formula (2) R2 and R3 are methyl, R4 is hydrogen and n is 2, or R2 and R3 are methyl, R4 is —$(CH_2)_2$—$N(CH_3)_2$ and n is 2. Overall, therefore, either N,N-dimethylethanolamine or bis(2-(dimethylamino)ethyl) ether is obtained.

It is further preferred that in the amine of the general formula (3), R5 is methyl, R6 and R7 are hydrogen, m is 2 and o is 2. Overall, therefore, N-methyldiethanolamine is obtained.

In a further embodiment of the process according to the invention, the reaction with the epoxide takes place at a temperature of from ≥70° C. to ≤150° C. The reaction temperature can preferably be from ≥80° C. to ≤130° C.

Particularly preferred catalysts are diazabicyclooctane, N-methyldiethanolamine, dimethylethanolamine, bis(2-(dimethylamino)ethyl) ether, diazabicyclo[5.4.0]undec-7-ene, dialkylbenzylamine, dimethylpiperazine, 2,2'-dimorpholinyl diethyl ether and pyridine or combinations thereof.

Although the process according to the invention is not limited to the use of the above-mentioned catalysts, it has been found that some amines can have an adverse effect on the purity of the reaction product. This can manifest itself in that dissolution of the ester bonds of the unsaturated carboxylic acid, that is to say saponification, can occur in some cases, or undesirable transesterification reactions. The secondary products are in some cases difficult to remove or impair the homogeneity of the reaction product if they are not removed or cannot be removed. For this reason, the catalyst should not be imidazole or N-methylimidazole, because these catalysts can lead to the above-mentioned undesirable secondary reactions. In other words, these compounds should not be brought into contact with the starting materials or (intermediate) products throughout the reaction.

As regards the time of addition of the catalyst, it is advantageous to add the catalyst at the same time as or prior to the addition of the unsaturated cyclic carboxylic acid anhydride.

The present invention relates further to a hydroxy-amino polymer obtainable by a process according to the invention, wherein the ratio of the amount of unsaturated cyclic carboxylic acid anhydride to the number of Zerewitinoff-active H atoms of the H-functional starter compound is at least approximately 0.9:1, preferably at least 0.98:1.

The hydroxy-amino polymer according to the invention can additionally be characterised in that the H-functional starter compound has a number average of more than 600 g/mol, in particular more than from 600 to 9000 g/mol, preferably from 800 to 8000 g/mol. As a result there are provided higher molecular weight hydroxy-amino polymers which have an almost equal content of hydroxyl and amino functionalities, the ratio being, for example, from 1.2:1 to 1:1.2, in particular from 1.1:1 to 1:1.1, preferably from 1.05:1 to 1:1.05.

An advantage of such higher molecular weight hydroxy-amino polymers is that a higher molecular weight can be reached more quickly in the reaction of such hydroxy-amino polymers with polyisocyanates to give polyurethane (urea) polymers, that is to say the polymer gains strength more quickly during curing.

The present invention is additionally directed to a polyurethane urea polymer obtainable by reaction of a polyisocyanate with a hydroxy-amino polymer by a process according to the invention. To that end, the hydroxy-amino polymers obtainable by the process according to the invention can be reacted, alone or optionally in admixture with further isocyanate-reactive components, with organic polyisocyanates, optionally in the presence of foaming agents, catalysts and optionally further additives such as, for example, cell stabilisers, and can thus be used as components of solid or foamed polyurethane ureas. Consequently, the invention also provides polyurethane ureas, preferably solid or foamed polyurethane ureas, in particular coating systems comprising the hydroxy-amino polymers according to the invention.

Suitable polyisocyanates are aliphatic, cycloaliphatic, araliphatic, aromatic and heterocyclic polyisocyanates, as are described, for example, by W. Siefken in Justus Liebigs Annalen der Chemie, 562, pages 75 to 136, for example those of formula (4)

$Q(NCO)_n$  (4)

wherein
n=from 2 to 4, preferably from 2 to 3,
and
Q denotes an aliphatic hydrocarbon radical having from 2 to 18, preferably from 6 to 10, carbon atoms, a cycloaliphatic hydrocarbon radical having from 4 to 15, preferably from 6 to 13, carbon atoms, or an araliphatic hydrocarbon radical having from 8 to 15, preferably from 8 to 13, carbon atoms.

For example, they are polyisocyanates as described in EP 0 007 502 A1, pages 7 to 8. Preference is generally given to the polyisocyanates that are readily accessible commercially, for example 2,4- and 2,6-toluene diisocyanate, as well as arbitrary mixtures of these isomers ("TDI"); polyphenylpolymethylene polyisocyanates, such as are prepared by aniline-formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluene diisocyanate or from 4,4'- and/or 2,4'-diphenylmethane diisocyanate. It is also possible to use urethane-group-containing polyisocyanates (prepolymers), which are, for example, reaction products of the polyisocyanates with polyricinoleic acid ester polyols or any desired other polyols. There is preferably used as the polyisocyanate at least one compound selected from the group consisting of 2,4- and 2,6-toluene diisocyanate, 4,4'- and 2,4'- and 2,2'-diphenylmethane diisocyanate and polyphenylpolymethylene polyisocyanate ("polynuclear MDI"); a mixture comprising 4,4'-diphenylmethane diisocyanate and 2,4'-diphenylmethane diisocyanate and polyphenylpolymethylene polyisocyanate is particularly preferably used as the polyisocyanate.

In addition to the above-mentioned polyisocyanates, conventional polyether polyols can additionally also be used for the preparation of the polyurethane (urea) polymers. Conventional polyether polyols within the meaning of the invention refers to compounds that are alkylene oxide addition products of starter compounds having Zerewitinoff-active hydrogen atoms, that is to say polyether polyols having a hydroxyl number according to DIN 53240 of from ≥15 mg KOH/g to ≤80 mg KOH/g, preferably from ≥20 mg KOH/g to ≤60 mg KOH/g. Examples of such polyols are known to the person skilled in the art. They can have a hydroxyl number according to DIN 53240 of from ≥15 mg KOH/g to ≤80 mg KOH/g, preferably from ≥20 mg KOH/g to ≤60 mg KOH/g. Starter compounds having Zerewitinoff-active hydrogen atoms used for the conventional polyether polyols mostly have functionalities of from 2 to 6, preferably from 3 to 6. The starter compounds are preferably hydroxy-functional. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, and methylol-group-containing condensation products of formaldehyde and phenol.

Suitable alkylene oxides for the conventional polyether polyols are, for example, ethylene oxide, propylene oxide, 1,2-butylene oxide or 2,3-butylene oxide and styrene oxide. Propylene oxide and ethylene oxide are preferably fed to the reaction mixture individually, in a mixture or in succession. If the alkylene oxides are metered in in succession, the products prepared contain polyether chains with block structures. Products with ethylene oxide blocks are characterised, for example, by increased concentrations of primary end groups, which impart advantageous isocyanate reactivity to the system.

Finally, the present invention is directed to the use of a hydroxy-amino polymer according to the invention in the preparation of a polyurethane urea polymer.

The present invention is explained in greater detail below with reference to exemplary embodiments.

Measurement and Determination Methods:

OH Number and Viscosity

Determination of the OH numbers was carried out as specified in DIN 53240. Determination of the acid numbers was carried out as specified in DIN EN ISO 2114. Determination of the amine numbers was carried out as specified in DIN 53176. The viscosities were determined by means of a rotary viscometer (Physica MCR 51, manufacturer: Anton Paar) as specified in DIN 53018 (spindle type CC27, shear rate range 16-128 $s^{-1}$).

EXAMPLE 1

According to the Invention 505 g (0.514 mol) of a bifunctional poly(oxypropylene) polyol with OH number=114 mg KOH/g (molecular weight 983 g/mol) were placed under a nitrogen atmosphere in a 1-liter laboratory autoclave and then heated to 125° C. 110.8 g (1.129 mol) of maleic anhydride and 0.616 g of diazabicyclooctane were added at that temperature and then stirred for 60 minutes at 125° C. 119.7 g (2.06 mol) of propylene oxide were then metered into the autoclave at 125° C. in the course of 30 minutes and then reacted for 3 hours at that temperature. The temperature was then lowered to 60° C., and an intermediate sample was withdrawn and analysed:
OH number=87.0 mg KOH/g
Acid number=0.23 mg KOH/g 114.2 g (1.13 mol) of 1-aminohexane were then added at 60° C. to the remainder of the batch. After a reaction time of 3 hours at 60° C., readily volatile constituents were removed by heating at 100° C. in vacuo for 60 minutes and the reaction mixture was then cooled to room temperature.

A product having the following analytical values was obtained:
OH number=154.2 mg KOH/g
Amine number=74 mg KOH/g
Viscosity (25° C.)=976 mPas.

COMPARISON EXAMPLE 1

Magnesium Hydroxide as Catalyst According to U.S. Pat. No. 4,874,837

505 g (0.514 mol) of a bifunctional poly(oxypropylene) polyol with OH number=114 mg KOH/g (molecular weight 983 g/mol) were placed under a nitrogen atmosphere in a 1-liter laboratory autoclave and then heated to 125° C. 110.8 g (1.129 mol) of maleic anhydride and 0.616 g of magnesium hydroxide were added at that temperature and then stirred for 60 minutes at 125° C. 119.7 g (2.06 mol) of propylene oxide were then metered into the autoclave at 125° C. in the course of 30 minutes and then reacted for 3 hours at that temperature. The temperature was then lowered to 60° C., and an intermediate sample was withdrawn and analysed:
OH number=82.1 mg KOH/g
Acid number=0.66 mg KOH/g 114.2 g (1.13 mol) of 1-aminohexane were then added at 60° C. to the remainder of the batch. After a reaction time of 3 hours at 60° C., readily volatile constituents were removed by heating at 100° C. in vacuo for 60 minutes and the reaction mixture was then cooled to room temperature.

A product having the following analytical values was obtained:
OH number=150.8 mg KOH/g
Amine number=71.5 mg KOH/g
Viscosity (25° C.)=1215 mPas.

This result shows, in comparison with Example 1 according to the invention, that the viscosity is significantly higher than that of the product according to the invention. At the same time, the OH number and also the amine number in the comparison example are below the values of the product according to the invention. That is to say, the number of functionalities per unit mass is higher in the product according to the invention.

COMPARISON EXAMPLE 2

Without Catalyst 505 g (0.514 mol) of a bifunctional poly(oxypropylene) polyol with OH number=114 mg KOH/g (molecular weight 983 g/mol) were placed under a nitrogen atmosphere in a 1-liter laboratory autoclave and then heated to 125° C. 110.8 g (1.129 mol) of maleic anhydride were added at that temperature and then stirred for 60 minutes at 125° C. 119.7 g (2.06 mol) of propylene oxide were then metered into the autoclave at 125° C. in the course of 30 minutes and then reacted for 3 hours at that temperature. The temperature was then lowered to 60° C., and an intermediate sample was withdrawn and analysed:
OH number=59.1 mg KOH/g
Acid number=35.2 mg KOH/g Because of the insufficient conversion of the acid groups with propylene oxide without the addition of catalyst, the test was terminated.

EXAMPLE 2

According to the Invention 650 g (0.146 mol) of a trifunctional, glycerol-started polyether polyol with an ethylene oxide/propylene oxide ratio of 73/27 (w/w) and OH number=37.9 mg KOH/g (molecular weight 4440 g/mol) were placed under a nitrogen atmosphere in a 1-liter laboratory autoclave and then heated to 60° C., 41.8 g (0.426 mol) of maleic anhydride and 0.734 g of N-methyldiethanolamine were added at that temperature and then stirred for 60 minutes at 60° C. The mixture was then heated to 90° C., and 77.4 g (1.76 mol) of ethylene oxide were metered into the autoclave at that temperature in the course of 30 minutes and then reacted for 2.5 hours at that temperature. The temperature was then lowered to 60° C., and an intermediate sample was withdrawn and analysed:
OH number=29.2 mg KOH/g
Acid number=0.04 mg KOH/g 32.0 g (0.438 mol) of 1-aminobutane were then added at 60° C. to the remainder of the batch. After a reaction time of 3 hours at 60° C., readily volatile constituents were removed by heating at 100° C. in vacuo for 60 minutes and the reaction mixture was then cooled to room temperature.

A product having the following analytical values was obtained:
OH number=64.4 mg KOH/g
Amine number=30.0 mg KOH/g
Viscosity (25° C.)=2880 mPas.

COMPARISON EXAMPLE 3

Magnesium Hydroxide as Catalyst According to U.S. Pat. No. 4,874,837

650 g (0.146 mol) of a trifunctional, glycerol-started polyether polyol with an ethylene oxide/propylene oxide ratio of 73/27 (w/w) and OH number=37.9 mg KOH/g (molecular weight 4440 g/mol) were placed under a nitrogen atmosphere in a 1-liter laboratory autoclave and then heated to 60° C. 41.8 g (0.426 mol) of maleic anhydride and 0.734 g of magnesium hydroxide were added at that temperature and then stirred for 60 minutes at 60° C. The mixture was then heated to 90° C., and 77.4 g (1.76 mol) of ethylene oxide were metered into the autoclave at that temperature in the course of 30 minutes and then reacted for 2.5 hours at that temperature. The temperature was then lowered to 60° C., and an intermediate sample was withdrawn and analysed:
OH number=21.5 mg KOH/g
Acid number=15.6 mg KOH/g Because of the insufficient conversion of the acid groups with ethylene oxide with magnesium hydroxide as catalyst, the test was terminated. It can be seen therefrom that only the process according to the invention permits the reaction of higher molecular weight starter compounds, which cannot be reacted by the process described in U.S. Pat. No. 4,874,837.

COMPARISON EXAMPLE 4

Without Catalyst 650 g (0.146 mol) of a trifunctional, glycerol-started polyether polyol with an ethylene oxide/propylene oxide ratio of 73/27 (w/w) and OH number=37.9 mg KOH/g (molecular weight 4440 g/mol) were placed under a nitrogen atmosphere in a 1-liter laboratory autoclave and then heated to 60° C. 41.8 g (0.426 mol) of maleic anhydride were added at that temperature and then stirred for 60 minutes at 60° C. The mixture was then heated to 90° C., and 77.4 g (1.76 mol) of ethylene oxide were metered into the autoclave at that temperature in the course of 30 minutes and then reacted for 2.5 hours at that temperature.

No reaction with ethylene oxide took place thereby, so that the test was terminated.

EXAMPLE 3

According to the Invention 505 g (0.514 mol) of a bifunctional poly(oxypropylene) polyol with OH number=114 mg KOH/g (molecular weight 983 g/mol) were placed under a nitrogen atmosphere in a 1-liter laboratory autoclave and then heated to 125° C. 110.8 g (1.129 mol) of maleic anhydride and 1.23 g of diazabicyclooctane were added at that temperature and then stirred for 60 minutes at 125° C. 122.7 g (2.11 mol) of propylene oxide were then metered into the autoclave at 125° C. in the course of 60 minutes and then reacted for 3 hours at that temperature. The temperature was then lowered to 60° C., and 115.3 g (1.13 mol) of N,N-dimethyl-1,3-diaminopropane were added at that temperature. After a reaction time of 3 hours at 60° C., readily volatile constituents were removed by heating at 100° C. for 60 minutes in vacuo, and the reaction mixture was then cooled to room temperature.

A product having an OH number of 166 mg KOH/g, an amine number of 161 mg KOH/g and a viscosity (25° C.) of 1355 mPas was obtained.

EXAMPLE 4

According to the Invention 350 g (0.35 mol) of a bifunctional poly(oxypropylene) polyol with OH number=112 mg KOH/g (molecular weight 1000 g/mol) were placed under a nitrogen atmosphere in a 1-liter laboratory autoclave and then heated to 125° C. 71.9 g (0.73 mol) of maleic anhydride and 0.48 g of diazabicyclooctane were added at that temperature and then stirred for 60 minutes at 125° C. 61.6 g (1.4 mol) of ethylene oxide were then metered into the autoclave at 125° C. in the course of 30 minutes and then reacted for 3 hours at that temperature. The temperature was then lowered to 60° C., and 74.2 g (0.73 mol) of 1-aminohexane were added at that temperature. After a reaction time of 1 hour at 60° C., readily volatile constituents were removed by heating at 100° C. for 60 minutes in vacuo, and the reaction mixture was then cooled to room temperature.

A product having an OH number of 156 mg KOH/g, an amine number of 71 mg KOH/g and a viscosity (25° C.) of 991 mPas was obtained.

EXAMPLE 5

According to the Invention 350 g (0.35 mol) of a bifunctional poly(oxypropylene) polyol with OH number=112 mg KOH/g (molecular weight 1000 g/mol) were placed under a nitrogen atmosphere in a 1-liter laboratory autoclave and then heated to 125° C. 71.9 g (0.73 mol) of maleic anhydride and 0.48 g of diazabicyclooctane were added at that temperature and then stirred for 60 minutes at 125° C. 61.6 g (1.4 mol) of ethylene oxide were then metered into the autoclave at 125° C. in the course of 30 minutes and then reacted for 3 hours at that temperature. The temperature was then lowered to 60° C., and 75.0 g (0.73 mol) of N,N-dimethyl-1,3-diaminopropane were added at that temperature. After a reaction time of 1 hour at 60° C., readily volatile constituents were removed by heating at 100° C. for 60 minutes in vacuo, and the reaction mixture was then cooled to room temperature.

A product having an OH number of 162 mg KOH/g, an amine number of 146 mg KOH/g and a viscosity (25° C.) of 1535 mPas was obtained.

EXAMPLE 6

According to the Invention 350 g (0.72 mol) of a bifunctional polyester based on diethylene glycol and phthalic anhydride with OH number=230 mg KOH/g (molecular weight 488 g/mol) were placed under a nitrogen atmosphere in a 1-liter laboratory autoclave and then heated to 125° C. 147.7 g (1.51 mol) of maleic anhydride and 0.67 g of diazabicyclooctane were added at that temperature and then stirred for 60 minutes at 125° C. 166.7 g (2.87 mol) of propylene oxide were then metered into the autoclave at 125° C. in the course of 60 minutes and then reacted for 3 hours at that temperature. The temperature was then lowered to 60° C., and 154 g (1.51 mol) of N,N-dimethyl-1,3-diaminopropane were added at that temperature. After a reaction time of 1 hour at 60° C., readily volatile constituents were removed by heating at 100° C. for 60 minutes in vacuo, and the reaction mixture was then cooled to room temperature.

A product having an OH number of 212 mg KOH/g, an amine number of 183 mg KOH/g and a viscosity (25° C.) of 68,550 mPas was obtained.

EXAMPLE 7

According to the Invention 350 g (0.72 mol) of a bifunctional polyester based on diethylene glycol and phthalic anhydride with OH number=230 mg KOH/g (molecular weight 488 g/mol) were placed under a nitrogen atmosphere in a 1-liter laboratory autoclave and then heated to 125° C. 147.7 g (1.51 mol) of maleic anhydride and 0.62 g of diazabicyclooctane were added at that temperature and then stirred for 60 minutes at 125° C. 126.4 g (2.87 mol) of ethylene oxide were then metered into the autoclave at 125° C. in the course of 60 minutes and then reacted for 3 hours at that temperature. The temperature was then lowered to 60° C., and 154 g (1.51 mol) of N,N-dimethyl-1,3-diaminopropane were added at that temperature. After a reaction time of 1 hour at 60° C., readily volatile constituents were removed by heating at 100° C. for 60 minutes in vacuo, and the reaction mixture was then cooled to room temperature.

A product having an OH number of 245 mg KOH/g, an amine number of 219 mg KOH/g and a viscosity (25° C.) of 17,350 mPas was obtained.

EXAMPLE 8

According to the Invention 500 g (0.113 mol) of a trifunctional, glycerol-started polyether polyol with an ethylene oxide/propylene oxide ratio of 73/27 (w/w) and OH number=37.9 mg KOH/g (molecular weight 4440 g/mol) were placed under a nitrogen atmosphere in a 1-liter laboratory autoclave and then heated to 125° C. 34.8 g (0.355 mol) of maleic anhydride and 0.53 g of diazabicyclooctane were added at that temperature and then stirred for 60 minutes at 125° C. 29.8 g (0.677 mol) of ethylene oxide were then metered into the autoclave at 125° C. in the course of 30 minutes and then reacted for 3 hours at that temperature. The temperature was then lowered to 60° C., and 35.9 g (0.355 mol) of 1-aminohexane were added at that temperature. After a reaction time of 1 hour at 60° C., readily volatile constituents were removed by heating at 100° C. for 60 minutes in vacuo and the reaction mixture was then cooled to room temperature.

A product having an OH number of 67.4 mg KOH/g, an amine number of 31.0 mg KOH/g and a viscosity (25° C.) of 3840 mPas was obtained.

These results demonstrate that the process according to the invention is not subject to the same limitations as the process known from U.S. Pat. No. 4,874,837. Accordingly, it is possible to use according to the invention also starter compounds having molar masses significantly above 600 g/mol, which in the prior-known process does not bring success. Moreover, the process according to the invention also yields products having improved properties, in particular owing to the use of the specific tertiary amine catalysts. Accordingly, in comparison to U.S. Pat. No. 4,874,837, using identical starting substances, products which are of lower viscosity while at the same time having a higher OH and amine functionality are obtained, which makes these compounds appear suitable in particular for use in the preparation of polyurethane urea polymers.

The invention claimed is:
1. A process for the preparation of a hydroxy-amino polymer, comprising:
   a) reacting an H-functional starter compound which has at least one Zerewitinoff-active H atom with an unsaturated cyclic carboxylic acid anhydride to form a carboxyl-group-containing prepolymer,
   b) reacting the carboxyl-group-containing prepolymer with at least one epoxide compound to form a hydroxyl-group-containing prepolymer, c) adding a primary amine and/or ammonia to the double bond of the hydroxyl-group-containing prepolymer formed in b) to yield the hydroxy-amino polymer, wherein a catalyst is added to the reaction mixture at the same time as or prior to the reaction of the carboxyl-group-containing prepolymer with the epoxide compound, with the catalyst comprising one or more tertiary amines; and the ratio of the number of moles of carboxylic acid anhydride to the number of moles of Zerewitinoff-active H atoms of the H-functional starter compound is from at least 0.9:1 to 1.5:1.

2. The process according to claim 1, wherein said H-functional starter compound contains from 1 to 35 Zerewitinoff-active H atoms.

3. The process according to claim 1, wherein said H-functional starter compound is a polyhydroxy-functional polymer selected from the group consisting of straight-chained polyethers, branched polyethers, polyesters, polyether polyesters, polycarbonates, polyether polycarbonates and mixtures thereof.

4. The process according to claim 3, wherein said polyether, said polyether polyester and/or said polyether polycarbonate contains ethylene oxide units, wherein the amount by weight of the ethylene oxide units in the polyether is at least 50 wt. %.

5. The process according to claim 1, wherein said H-functional starter compound has a mean molar weight of from 200 to 10,000 g/mol.

6. The process according to claim 1, wherein said unsaturated cyclic carboxylic acid anhydride is selected from unsaturated cyclic dicarboxylic acid anhydrides.

7. The process according to claim 1, wherein said epoxide compound is selected from epoxides having from 2 to 24 carbon atoms.

8. The process according to claim 1, wherein said ratio of the number of moles of carboxylic acid anhydride to the number of moles of Zerewitinoff-active H atoms of the H-functional starter compound is from 0.98:1 to 1.2:1.

9. The process according to claim 1, wherein said primary amine is a monoamine or a diamine, contains at least one primary amino group and is selected from aliphatic amines, cycloaliphatic amines and/or araliphatic amines.

10. The process according to claim 1, wherein said tertiary amine catalyst comprises diazabicyclooctane, N-methyldiethanolamine, dimethylethanolamine bis(2-(dimethylamino) ethyl)ether, diazabicyclo[5.4.0]undec-7-ene, dialkylbenzylamine, dimethylpiperazine, 2,2'-dimorpholinyl diethyl ether and pyridine or combinations thereof.

11. The process according to claim 1, wherein said H-functional starter compound has a number average molecular weight of more than 600 g/mol.

12. The process according to claim 1, wherein the ratio of hydroxyl functionalities to amine functionalities is from 1.2:1 to 1:1.2.

13. The process according to claim 1, comprising the reaction of a polyisocyanate with said hydroxy-amino polymer to obtain a polyurethane.

\* \* \* \* \*